United States Patent
Hamada et al.

(10) Patent No.: US 8,711,240 B2
(45) Date of Patent: Apr. 29, 2014

(54) DATA RECORDING APPARATUS WITH RECORDING CONTROL BASED ON DEFECT BLOCK AND CONTROL METHOD THEREOF

(75) Inventors: Naru Hamada, Tokyo (JP); Keiichi Inoue, Tokyo (JP); Hirofumi Honda, Machida (JP); Toshinori Koba, Kawasaki (JP); Koji Ogaki, Koza-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 12/977,663

(22) Filed: Dec. 23, 2010

(65) Prior Publication Data

US 2011/0176017 A1 Jul. 21, 2011

(30) Foreign Application Priority Data

Jan. 15, 2010 (JP) ................. 2010-007443

(51) Int. Cl.
*H04N 5/225* (2006.01)
(52) U.S. Cl.
USPC ............ 348/220.1; 711/103; 365/185.33; 365/185.02; 365/185.09; 365/200; 365/201
(58) Field of Classification Search
CPC .............. G06F 12/0246; G11B 20/1883
USPC ........... 348/231.99–231.9, 220.1; 711/103
See application file for complete search history.

(56) References Cited

U.S. PATENT DOCUMENTS

| | | | |
|---|---|---|---|
| 6,031,758 A | 2/2000 | Katayama et al. | |
| 6,295,257 B1 | 9/2001 | Ito et al. | |
| 7,283,729 B2 | 10/2007 | Chung et al. | |
| 7,979,636 B2 | 7/2011 | Ito | |
| 8,314,857 B2 * | 11/2012 | Nakase et al. | 348/231.3 |
| 8,611,194 B2 * | 12/2013 | Akahoshi | 369/44.32 |
| 2003/0041253 A1 | 2/2003 | Matsui et al. | |

(Continued)

FOREIGN PATENT DOCUMENTS

| | | |
|---|---|---|
| JP | 09-223363 A | 8/1997 |
| JP | 2002-109895 | 4/2002 |

(Continued)

OTHER PUBLICATIONS

Related U.S. Appl. No. 13/013,425, filed Jan. 25, 2011 "Recording Apparatus and Control Method Thereof".

(Continued)

*Primary Examiner* — Roberto Velez
*Assistant Examiner* — Cynthia Segura
(74) *Attorney, Agent, or Firm* — Cowan, Liebowitz & Latman, P.C.

(57) ABSTRACT

A data recording apparatus records data onto a recording medium having a flash memory in which data can be written in block units using a part of a recording region as an alternative block for a defect block in which normal data writing cannot be performed. The data recording apparatus causes a user to select one of plural recording modes including a first recording mode and a second recording mode in which an amount of data to be processed is larger than that of the first recording mode, then obtains data in the selected recording mode and stores the data onto the recording medium. If an alternative block remaining amount obtained from the recording medium is equal to or less than a threshold value, the data recording apparatus allows recording in the first recording mode and inhibits recording in the second recording mode.

9 Claims, 7 Drawing Sheets

(56) References Cited

U.S. PATENT DOCUMENTS

| | | | |
|---|---|---|---|
| 2003/0191980 A1 | 10/2003 | Gotoh et al. | |
| 2005/0259163 A1 | 11/2005 | Tsujii et al. | |
| 2007/0222896 A1* | 9/2007 | Oikawa | 348/725 |
| 2008/0046649 A1 | 2/2008 | Ito | |
| 2009/0313444 A1* | 12/2009 | Nakamura | 711/159 |
| 2010/0115185 A1* | 5/2010 | Ono et al. | 711/103 |
| 2011/0187896 A1* | 8/2011 | Hamada | 348/231.2 |
| 2011/0188834 A1* | 8/2011 | Matsushima | 386/248 |
| 2011/0264842 A1* | 10/2011 | Nakanishi et al. | 711/103 |
| 2011/0283054 A1* | 11/2011 | Kozakai et al. | 711/103 |

FOREIGN PATENT DOCUMENTS

| | | | | |
|---|---|---|---|---|
| JP | 2004-158953 A | 6/2004 | | |
| JP | 2005-252499 A | 9/2005 | | |
| JP | 2006-025213 A | 1/2006 | | |
| JP | 2008-009594 A | 1/2008 | | |
| JP | 2008-046923 A | 2/2008 | | |
| JP | 2008-097148 A | 4/2008 | | |
| JP | 2008-097169 A | 4/2008 | | |
| WO | WO 2008018446 A1 * | 2/2008 | | G06F 12/02 |
| WO | WO 2009001519 A1 * | 12/2008 | | G06F 12/16 |

OTHER PUBLICATIONS

Related U.S. Appl. No. 13/013,474, filed Jan. 25, 2011 "Recording Apparatus and Method".

Related U.S. Appl. No. 13/014,349, filed Jan. 26, 2011 "Recording Apparatus and Control Method Thereof".

The above references were cited in a Jul. 12, 2012 U.S. Office Action, which is enclosed, that issued in U.S. Appl. No. 13/013,425.

This reference was cited in an Apr. 3, 2013 U.S. Office Action, which is enclosed, that issued in related U.S. Appl. No. 13/013,474.

The above references were cited in a Oct. 18, 2013 Japanese Office Action, which is enclosed without English Translation, that issued in Japanese Patent Application No. 2010-007443.

The above references were cited in a Aug. 28, 2013 U.S. Office Action, which is not enclosed, that issued in related U.S. Appl. No. 13/014,349.

The above references were cited in a Sep. 5, 2013 US Notice of Allowance that issued in related U.S. Appl. No. 13/013,425, which is enclosed.

The above references were cited in a Sep. 24, 2013 Japanese Office Action, which is enclosed without English Translation, that issued in Japanese Patent Application No. 2010-022522, which is a counterpart application of the related U.S. Appl. No. 13/013,474.

* cited by examiner

DATA RECORDING APPARATUS WITH RECORDING CONTROL BASED ON DEFECT BLOCK AND CONTROL METHOD THEREOF

BACKGROUND OF THE INVENTION

1. Field of the Invention

The present invention relates to a data recording apparatus to perform data recording utilizing a flash memory and a control method of the data recording apparatus.

2. Description of the Related Art

Conventionally, a video camera to record a moving image and audio data on a recording medium has been known. Further, in recent years, a video camera to record such moving image and audio data into a large capacity flash memory or a memory card including a flash memory has appeared.

In a flash memory, data writing/reading is performed by a unit called a "block". In some cases, a defect block in which normal data writing cannot be performed occurs due to some problem during its manufacturing process or a posteriori cause. Accordingly, a part of the memory is prepared as an alternative block for such defect block, and data to be recorded in the defect block is written in this alternative block (for example, Japanese Patent Laid-Open No. 2002-109895).

Further, when the alternative block has been used up, during data writing, when data writing cannot be normally performed and a writing error occurs, retry processing to perform address rearrangement in a general recording area including this defect block to write data is also studied.

When retry processing is performed as above during moving image data recording, data writing cannot be performed during the retry processing. Accordingly, the moving image data to be recorded must be stored in a buffer memory or the like before the retry processing is complete.

However, when the data rate of the moving image data is high or when it takes a long time to perform the retry processing, the moving image data overflows the buffer memory since the retry processing cannot be performed in time, and normal recording cannot be performed. To avoid this problem, a large capacity buffer memory is required. However, in a consumer video camera or the like, it is undesirable to prepare such a large capacity buffer memory in consideration of cost, device size and the like. As a result, there is a problem that moving image recording cannot be performed in the above case.

SUMMARY OF THE INVENTION

The present invention has been made in view of the above-described problem, and according to an aspect of the present invention, a data recording apparatus capable of occurrence of abnormality such as buffer memory overflow during data recording on a recording medium having an alternative block and a control method of the data recording apparatus are provided.

According to one aspect of the present invention, there is provided a recording apparatus comprising: a recording unit configured to record data onto a recording medium having a flash memory in which data is written in block units using a part of a recording region of the flash memory as an alternative block for a defect block; a selection unit configured to select one of a plurality of recording modes including a first recording mode and a second recording mode in which an amount of data to be processed is larger than that of the first recording mode, by a user; an acquisition unit configured to acquire an alternative block remaining amount from the recording medium; and a control unit configured to, if the alternative block remaining amount acquired by the acquisition unit is equal to or less than a threshold value, allow recording by the recording unit in the first recording mode and inhibit recording in the second recording mode.

Also, according to another aspect of the present invention, there is provided a recording apparatus control method, comprising: a data recording step of recording data onto a recording medium having a flash memory in which data is written in block units using a part of a recording region of the flash memory as an alternative block for a defect block; a selection step of selecting one of a plurality of recording modes including a first recording mode and a second recording mode in which an amount of data to be processed is larger than that of the first recording mode, by a user; an acquisition step of acquiring an alternative block remaining amount from the recording medium; and a control step of, when the alternative block remaining amount acquired at the acquisition step is equal to or less than a threshold value, allowing recording at the recording step in the first recording mode while inhibiting recording in the second recording mode.

Also, according to another aspect of the present invention, there is provided a data recording apparatus comprising: a recording unit configured to record information data at mutually different data rates on a recording medium having a plurality of blocks including an alternative block for a defect block; and a control unit configured to allow recording of information data at a higher data rate in accordance with an alternative block remaining amount in the recording medium.

Furthermore, according to another aspect of the present invention, there is provided a data recording apparatus comprising: a recording unit configured to record moving image data and still image data on a recording medium having a plurality of blocks including an alternative block for a defect block; and a control unit to, if an alternative block remaining amount in the recording medium is greater than a threshold value, allow recording of the moving image data and still image data, and if the alternative block remaining amount is equal to or less than the threshold value, allow recording of the still image data and inhibits recording of the moving image data.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
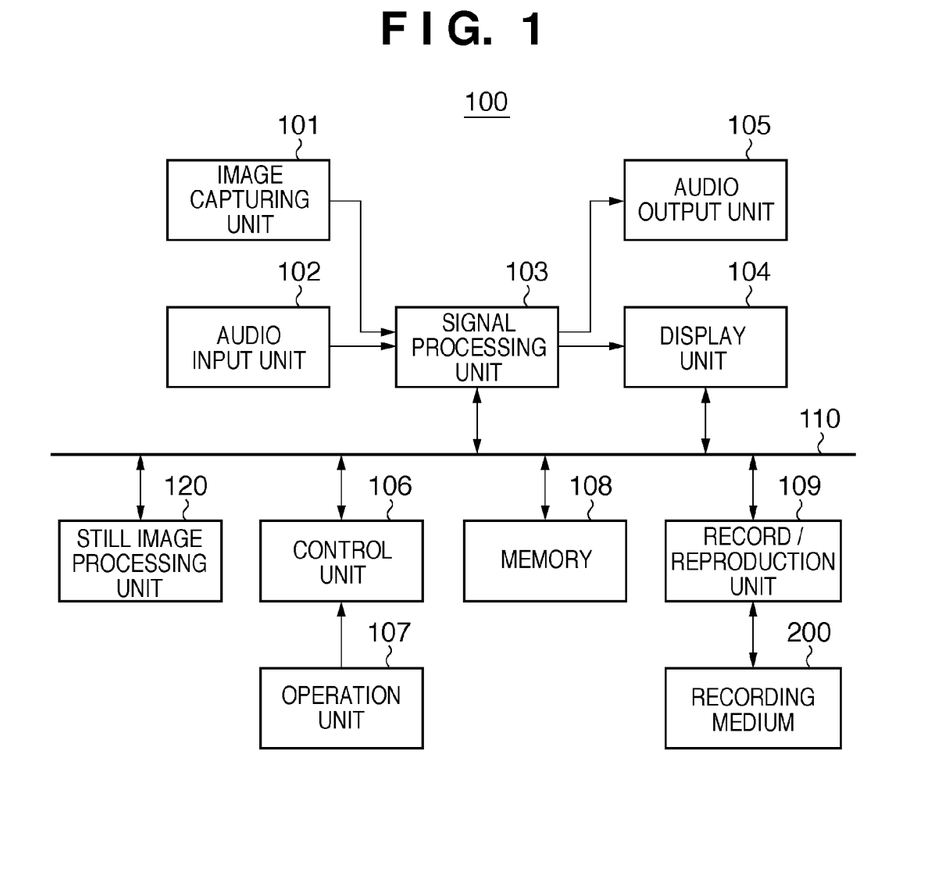
FIG. 1 is a block diagram showing a configuration of a video camera according to a first embodiment of the present invention.

FIG. 1 is a block diagram showing a configuration of a video camera 100 according to a first embodiment of the present invention. Note that a still image processing unit 120 is a constituent element used in a second embodiment and it can be omitted in the first embodiment. The still image processing unit 120 will be described in the second embodiment. In FIG. 1, an image capturing unit 101 captures an object image and outputs moving image data to a signal processing unit 103. An audio input unit 102, having a microphone, outputs audio data to the signal processing unit 103. Upon recording, the signal processing unit 103 performs necessary processing such as compression, coding and the like based on a predetermined coding method such as MPEG (Moving Picture Experts Group), on the moving image data from the image capturing unit 101 and the audio data from the audio input unit 102. Further, upon reproduction, the signal processing unit 103 decodes reproduced moving image data and audio data. Upon recording, a display unit 104 displays the captured moving image from the signal processing unit 103. Further, upon reproduction, the display unit 104 displays the reproduced moving image from the signal processing unit 103. Further, the display unit 104 displays necessary information such as a menu under the control of a control unit 106. An audio output unit 105, having a speaker, outputs an audio signal from the signal processing unit 103.

The control unit 106, having a microcomputer, a memory and the like, controls the respective constituent elements of the video camera 100. An operation unit 107 has a power switch, a switch for recording start/halt instruction, a switch to a reproduction mode, a menu switch and the like. The user operates the respective switches of the operation unit 107, thereby designates functions of the video camera 100. A memory 108 having an SDRAM (Synchronous Dynamic Random Access Memory) or the like holds compressed moving image data, audio data, and other necessary data. Further, the memory 108 also functions as a buffer memory upon data recording/reproduction with respect to a recording medium 200. A record/reproduction unit 109 performs data writing/reading with respect to the recording medium 200 in accordance with an instruction from the control unit 106. The recording medium 200 is a random access recording medium. In the present embodiment, the recording medium 200 is a memory card including a NAND flash memory. The recording medium 200 can be easily attached and discharged by the user with respect to the video camera 100 with an attachment/discharge mechanism (not shown). A system bus 110 transmits data and various commands among the respective blocks.

In the present embodiment, the control unit 106 manages information data such as moving image and audio data recorded on the recording medium 200 as a file in accordance with a predetermined file system such as an FAT (File Allocation Table) file system. For this purpose, in addition to the information file holding such information data, file system information for management of recorded files is recorded on the recording medium 200. Further, in accordance with information file recording processing, the file system information recorded on the recording medium 200 is updated. Note that the record/reproduction unit 109 may have a configuration corresponding to a general interface such as ATA (Advanced Technology Attachment). In this case, the control unit 106 controls data writing and reading with respect to the recording medium 200 by outputting a predetermined command with the general interface to the record/reproduction unit 109.

In the present embodiment, two recording modes with mutually different data rates for moving image data to be recorded are provided. The user operates the operation unit 107 in a recording halt state where the recording of the moving image and the audio is halted, thereby selects and sets one of these two recording modes. In the present embodiment, a standard image quality mode (first recording mode), and a high image quality mode (second recording mode) with a moving image data rate higher than that of the standard image quality mode, are provided as these two recording modes. That is, in the second recording mode, the amount of data to be processed is larger and the memory capacity is larger than those in the first recording mode. The control unit 106 controls the moving image compression ratio in the signal processing unit 103 so as to output moving image data at a data rate corresponding to the recording mode set by the user.

Figure 2:
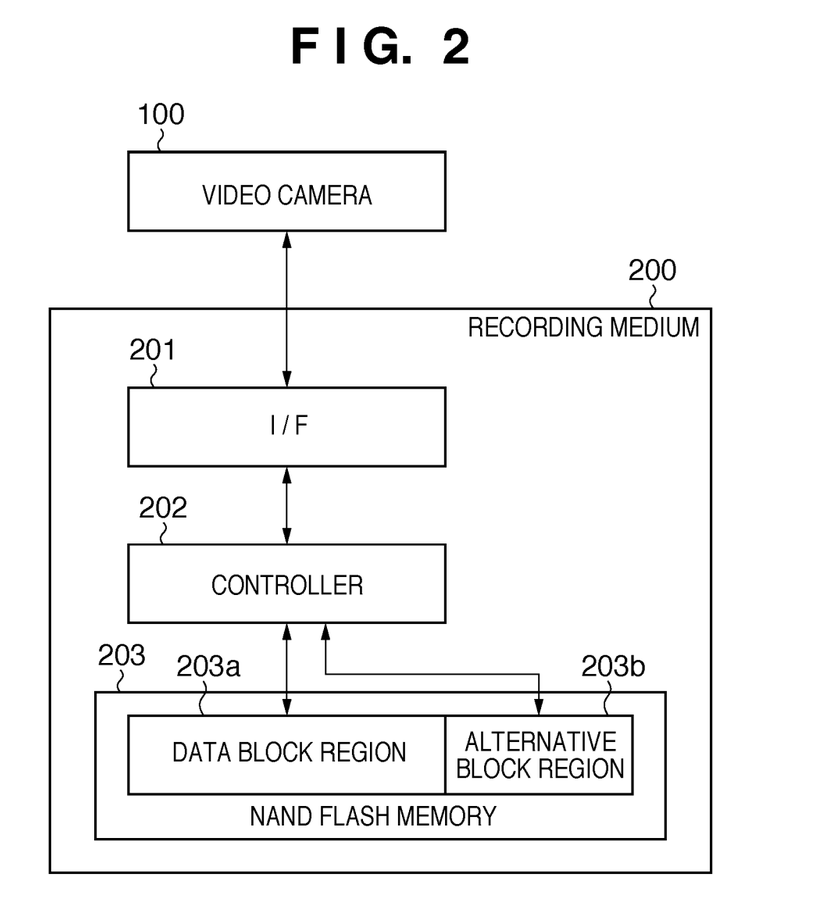
FIG. 2 is a block diagram showing a configuration of a recording medium in the first embodiment.

Next, the recording medium 200 will be described. FIG. 2 is a block diagram showing a configuration of the recording medium 200. As shown in FIG. 2, the recording medium 200 has an interface 201 (hereinbelow, "I/F 201") for transmission/reception of data and commands with respect to a recording device such as the video camera 100, a controller 202, and a NAND flash memory 203 (hereinbelow, "flash memory 203"). The flash memory 203, capable of data writing/recording by block having plural bytes, performs data writing using a part of a recording region as an alternative block for a defect block in which normal data writing cannot be performed. Accordingly, the flash memory 203 has a normal data block region 203a and an alternative block region 203b for a defect block in the data block region. In the present embodiment, predetermined addresses of the flash memory 203 are previously allocated as the alternative block region 203b.

In FIG. 2, the interface (I/F) 201 transmits/receives commands and data with respect to the record/reproduction unit 109 in the video camera 100. Further, the controller 202 controls data writing or reading with respect to the flash memory 203 in correspondence with a command received with the I/F 201. For example, when a writing request command is received from the record/reproduction unit 109, the controller 202 receives data to be written from the record/reproduction unit 109 and performs writing processing into the data block region 203a. Further, when the writing processing has been normally completed, the controller 202 generates a writing result as a response and transmits the response via the I/F 201 to the record/reproduction unit 109.

Further, when the data writing into the data block region 203a has not been completed within a predetermined period, it is determined that a defect block has occurred. The controller 202 writes the data into an unused block in the alternative block region 203b in place of the defect block. Then, the controller 202 changes an address map of the flash memory 203 so as to replace the address of the defect block with the address of the alternative block, generates a response including an error due to the writing failure and transmits the response via the I/F 201 to the record/reproduction unit 109. Further, when a defect block occurs, the controller 202 writes information on the position of the defect block, the number of defect block(s) and the like into a system management region in the data block region 203a. The controller 202 allocates an address (physical address) of the flash memory 203 to an address (logical address) designated from an external device, and generates an address map showing the linkage between the respective logical addresses and the physical addresses. Then, when a defect block occurs, the controller 202 changes the address map so as to allocate an address of the alternative block to the designated logical address. The controller 202 stores the address map in the data block region 203a.

Further, when a defect block occurs in a status where the remaining amount of the alternative block is small, the controller 202 performs retry processing. In the retry processing, the address of the defect block is rearranged, and data is written into an unused block (including the defect block) in the data block region 203a.

Further, in the present embodiment, as described later, when a request for transmission of available remaining amount in the alternative block region is received from the video camera 100, the controller 202 detects an alternative block remaining amount. Then, the controller 202 notifies the record/reproduction unit 109 of information on the alternative block remaining amount via the I/F 201.

Figure 3:
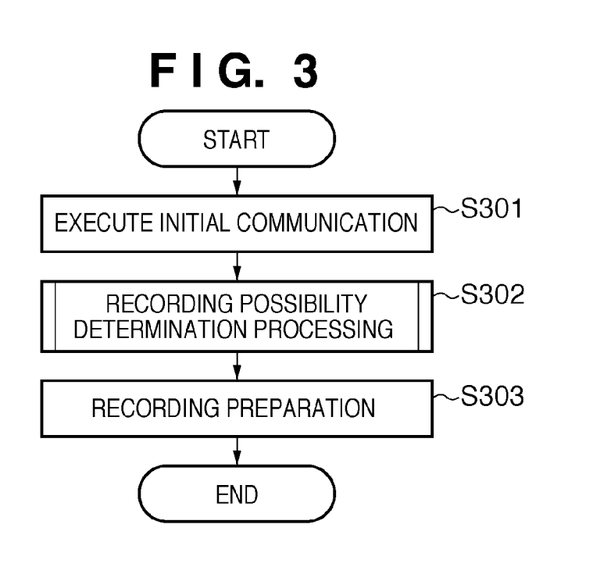
FIG. 3 is a flowchart showing recording medium mounting processing.

Next, recording preparation (mounting) processing of the recording medium 200 upon attachment of the recording medium 200 and upon power-on of the video camera 100 will be described. FIG. 3 is a flowchart showing the mounting processing. The processing in FIG. 3 is executed by controlling the respective units by the control unit 106.

When the power of the video camera 100 is turned on, the record/reproduction unit 109 determines whether or not the recording medium 200 is attached. When the recording medium 200 is attached, the record/reproduction unit 109 notifies the control unit 106 of the attachment of the recording medium 200. Further, in a status where the power of the video camera 100 is on, when the record/reproduction unit 109 detects that the recording medium 200 has been newly attached, the record/reproduction unit 109 notifies the control unit 106 of the new attachment of the recording medium 200. In this manner, when the record/reproduction unit 109 notifies that the recording medium 200 is attached upon power-on, or when the record/reproduction unit 109 detects that the recording medium 200 has been newly attached, the processing shown in FIG. 3 is started.

First, the control unit 106 executes initial communication (S301). In the initial communication, the controller 202 of the recording medium 200 is reset, and register information of the recording medium 200 necessary for data recording is received from the recording medium 200. Next, in accordance with the obtained information, recording possibility determination processing is executed (S302) to determine whether or not data recording with respect to the recording medium 200 is possible. Then recording preparation processing is executed (S303). More particularly, the file system information is read from the recording medium 200 and stored into the memory 108, and the contents of the file system information are analyzed. Then, information necessary for recording such as a recording capacity of the recording medium 200 is obtained. Further, file(s) recorded on the recording medium 200 is checked, and file(s), which can be managed with the video camera 100, is retrieved.

Figure 4:
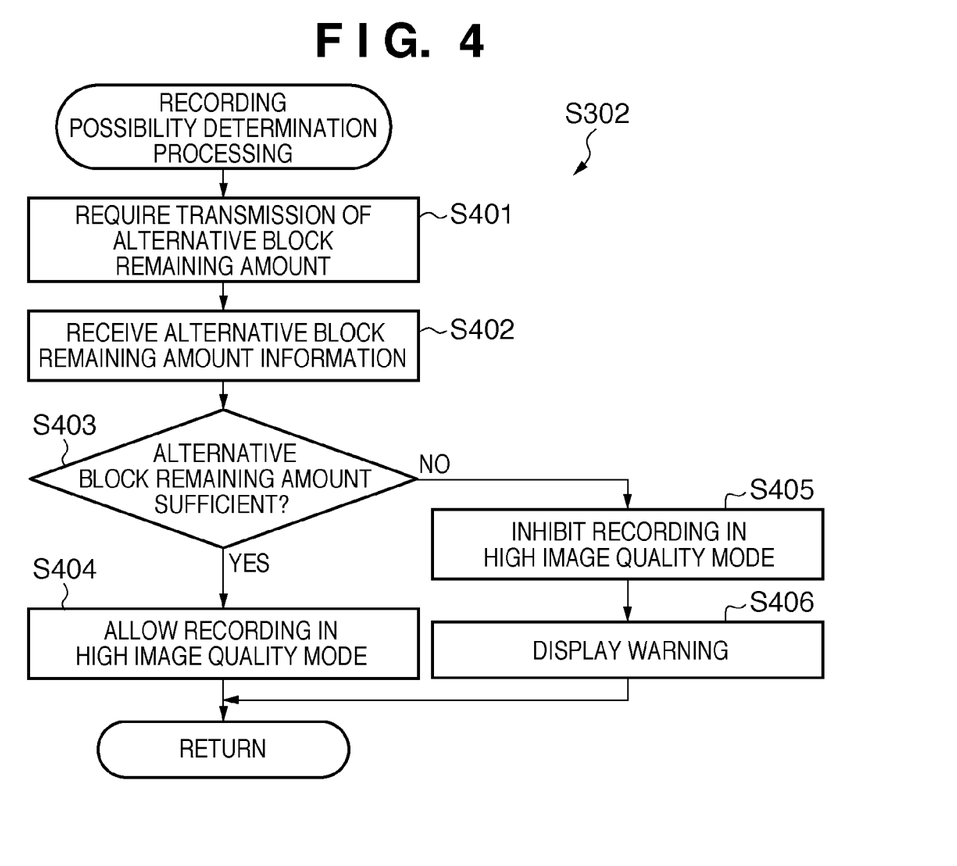
FIG. 4 is a flowchart showing recording possibility determination processing according to the first embodiment.

Next, the recording possibility determination processing (S302) executed upon execution of the mounting processing of the recording medium 200 will be described. FIG. 4 is a flowchart showing the recording possibility determination processing according to the first embodiment. In FIG. 4, first, the controller 202 of the recording medium 200 is required of transmission of the alternative block remaining amount information (S401). When the transmission of the alternative block remaining amount information is required from the video camera 100, the controller 202 detects the remaining amount of the alternative block region 203b, and transmits information indicating the remaining amount of the alternative block region 203b to the record/reproduction unit 109. The record/reproduction unit 109 receives the information indicating the remaining amount of the alternative block region, and transmits the information to the control unit 106 (S402).

Next, the control unit 106 determines whether or not the alternative block remaining amount is equal to or less than a threshold value based on the remaining amount of the received alternative block region 203b (S403). In the present embodiment, for example, the threshold value=0 holds, and it is determined whether or not the alternative block remaining amount is sufficient. Then, when it is determined that the remaining amount of the alternative block region 203b is sufficient, the control unit 106 allows moving image recording in the high image quality mode and the standard image quality mode (S404). Further, when it is determined that the remaining amount of the alternative block region 203b is not sufficient, the control unit 106 inhibits the moving image recording in the high image quality mode (S405). Then, the control unit 106 displays warning information, indicating that the moving image recording in the high image quality mode is inhibited due to shortage of the alternative block amount, on the display unit 104 (S406).

Figure 5:
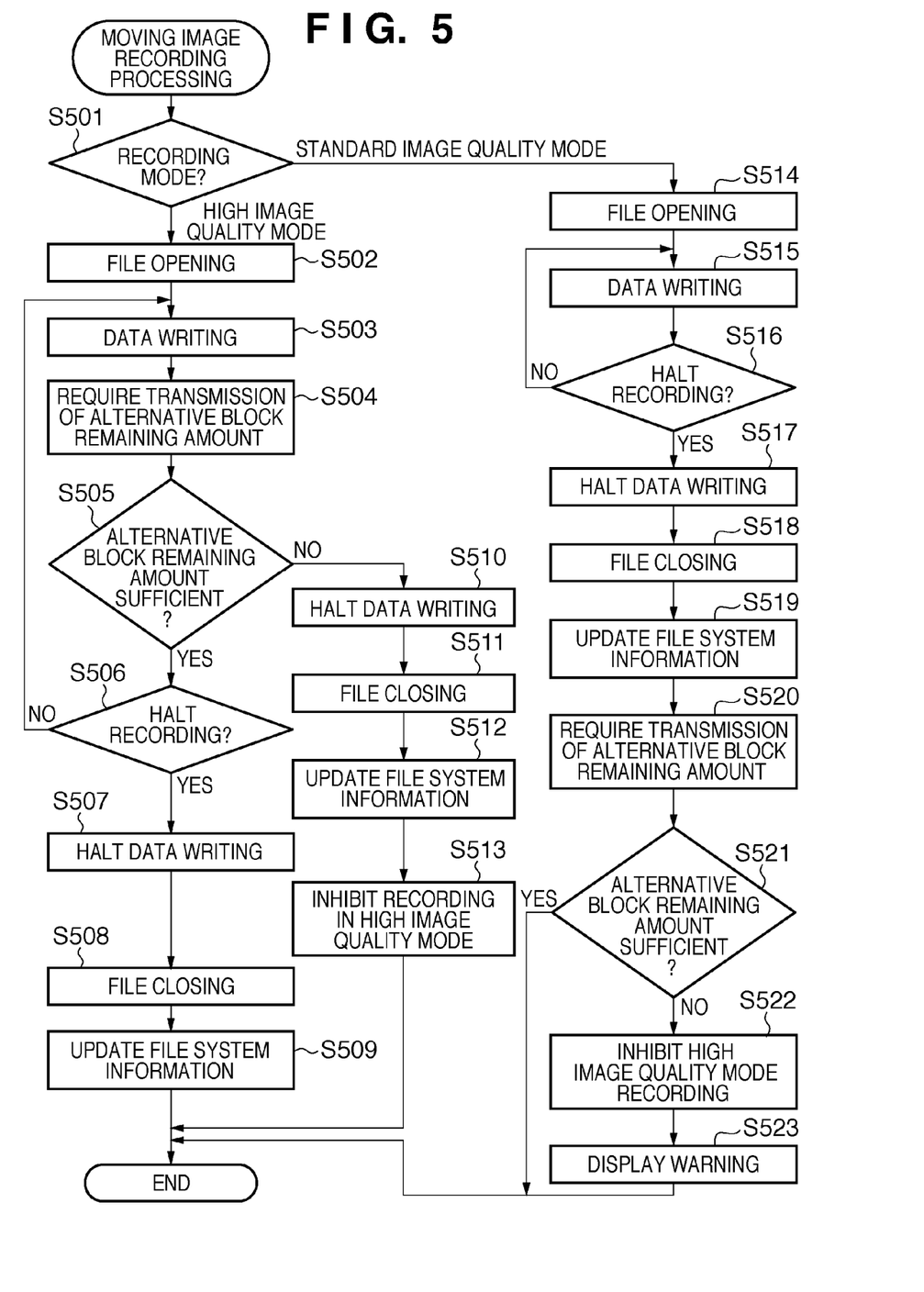
FIG. 5 is a flowchart showing recording processing according to the first embodiment.

Next, moving image recording control by the control unit 106 in the present embodiment will be described. FIG. 5 is a flowchart showing the moving image recording processing in the video camera 100 according to the first embodiment. The processing in FIG. 5 is executed by controlling the respective units by the control unit 106. Note that upon start of the recording control, the user can select a desired recording mode from plural recording modes using a predetermined user interface. In the present embodiment, any one of the above-described standard image quality mode and the high image quality mode can be selected as the moving image recording mode.

When the user operates the operation unit 107 to instruct to start recording, the processing in FIG. 5 is started. First, the control unit 106 determines the recording mode selected by the user (S501). When the user has selected the high image quality mode, the control unit 106 executes file open processing to open an moving image file to store captured moving image data and inputted audio data (S502). In this processing, a file name is determined, and the file information is registered with respect to the file system information stored in the memory 108.

Further, the control unit 106 controls the signal processing unit 103 to execute compression processing on the moving image data from the image capturing unit 101 and the audio data from the audio input unit 102, and stores the compressed moving image data and audio data into the memory 108. At this time, as described above, the signal processing unit 103 compresses the moving image data at a compression ratio corresponding to the high image quality mode. Then, when a predetermined amount of moving image data and audio data corresponding to a writing unit to the recording medium 200 has been stored into the memory 108, the record/reproduction unit 109 reads the predetermined amount of data from the memory 108, and writes the data onto the recording medium 200 (S503).

Note that in the present embodiment, the rate of data which can be written on the recording medium 200 is higher than that of the moving image data and the audio data outputted from the signal processing unit 103 in the high image quality mode. Accordingly, data writing with respire to the recording medium 200 is performed intermittently. The memory 108 functions as a buffer memory for this intermittent recording. More particularly, when moving image data and audio data to be recorded on the recording medium 200 in a data amount corresponding to a previously-set writing unit has been stored in the memory 108, data writing with respect to the recording medium 200 is started. Further, in the present embodiment, the memory 108 has a capacity to avoid data overflow even upon occurrence of the above-described retry processing during recording in the standard image quality mode.

When the data writing for the writing unit has been completed, the data writing with respect to the recording medium 200 is halted. In this manner, the data is intermittently written by repeating the data writing for the writing unit. In this manner, when the data writing for one recording unit has been completed, the control unit 106 requests transmission of the alternative block remaining amount information from the recording medium 200 (S504). As described at step S402, the controller 202 of the recording medium 200 detects the remaining amount of the alternative block region 203b and transmits information indicating the remaining amount. The control unit 106 receives the alternative block remaining amount information, and determines whether or not the alternative block remaining amount is greater than a threshold value (S505). As described above, in the present embodiment, on the presumption that the threshold value=0 holds, it is determined whether or not the alternative block remaining amount is sufficient. Note that a case where the threshold value≠0 holds will be described in a third embodiment.

When it is determined that the alternative block remaining amount is sufficient, the control unit 106 continues the writing, and waits for a recording halt instruction from the user. When it is detected that the user has operated the operation unit 107 to instruct to halt the recording (S506), the control unit 106 halts the recording of new moving image data and audio data with respect to the memory 108 at that time. Then, the control unit 106 writes the stored data onto the recording medium 200, and halts the writing (S507). Next, the control unit 106 closes the currently recorded file (S508), changes the content of the file system information stored in the memory 108, and writes the file system information onto the recording medium 200, thereby the update is completed (S509).

On the other hand, at step S505, when it is determined that the alternative block remaining amount is not sufficient, the control unit 106 halts the data writing before reception of the recording halt instruction from the user (S510), and closes the currently-recorded file (S511). Then the control unit 106 changes the content of the file system information stored in the memory 108 in accordance with the recording halt, and writes the file system information onto the recording medium 200, thereby the update is completed (S512). Then, hereafter, the control unit 106 inhibits moving image recording in the high image quality mode (S513).

Further, when it is determined at step S501 that the standard image quality mode is selected, the control unit 106 executes file open processing to file a moving image file for storage of captured moving image data and inputted audio data (S514). Then, the control unit 106 controls the signal processing unit 103 to perform compression processing on the moving image data from the image capturing unit 101 and the audio data from the audio input unit 102, and stores the compressed moving image data and audio data into the memory 108. At this time, as described above, the signal processing unit 103 compresses the moving image data at a compression ratio corresponding to the standard image quality mode. Then, when a predetermined amount of moving image data and audio data corresponding to the writing unit has been stored in the memory 108, the record/reproduction unit 109 reads the predetermined amount of data from the memory 108, and writes the data onto the recording medium 200 (S515).

As described above, the control unit 106 repeatedly performs data writing with respect to the recording medium 200, however, does not check the alternative block remaining amount. Then, upon reception of recording halt instruction from the user (S516), the control unit 106 halts storage of new moving image data and audio data with respect to the memory 108 at that time, writes the stored data onto the recording medium 200, and halts the writing (S517). Then, the control unit 106 closes the currently-recorded file (S518), changes the content of the file system information stored in the memory 108, and writes the file system information onto the recording medium 200, thereby the update is completed (S519).

Next, when the recording in the standard image quality mode has been completed, the control unit 106 requires transmission of the alternative block remaining amount information from the recording medium 200 (S520). The controller 202 of the recording medium 200 detects the remaining amount of the alternative block region 203b as described above and transmits information indicating the remaining amount. The control unit 106 receives the alternative block remaining amount information, and determines whether or not the alternative block remaining amount is sufficient (S521). When it is determined that the alternative block remaining amount is sufficient, the processing is terminated. At this time, recording in the high image quality mode is allowed. On the other hand, when it is determined that the alternative block remaining amount is not sufficient, the control unit 106 inhibits the recording in the high image quality mode hereinafter (S522). Then the control unit 106 displays warning information indicating that status (the moving image recording in the high image quality mode has been inhibited due to shortage of alternative block) on the display unit 104 for a predetermined period (S523).

Next, reproduction processing will be described. Upon designation of a reproduction mode with the operation unit 107, the control unit 106 controls the record/reproduction unit 109, to read the respective moving image files recorded on the recording medium 200, and output them to the signal processing unit 103. The signal processing unit 103 decodes head images of the respective moving image files, generates representative images of the respective moving image files using these head images, and displays a list of the representative images on the display unit 104.

When the user selects a desired representative image from the list of representative images and instructs to start reproduction, the control unit 106 instructs the record/reproduction unit 109 to reproduce a moving image file corresponding to the selected representative image. The record/reproduction unit 109 reproduces the designated moving image file from the recording medium 200, and outputs it to the signal processing unit 103. The signal processing unit 103 decodes the moving image data and the audio data of the reproduced moving image file, and outputs the respective data to the display unit 104 and the audio output unit 105. Upon issuance of reproduction halt instruction, the control unit 106 halts the reproduction of the moving image file.

In this manner, according to the present embodiment, the alternative block remaining amount in a recording medium is detected, and when the alternative block remaining amount is sufficient, recording in the high image quality mode and in the standard image quality mode is allowed, while when the remaining amount is not sufficient, the recording in the high image quality mode is inhibited. Accordingly, when the alternative block remaining amount is not sufficient, the occurrence of memory overflow due to recording in the high image quality mode can be prevented, and normal moving image recording in the standard image quality mode is possible. Further, it is not necessary to provide a large capacity buffer memory to prevent data overflow in the high image quality mode.

Note that in the present embodiment, in a construction where it is possible to select a first recording mode and a second recording mode in which a processing data amount is larger than that of the first recording mode, when the alternative block remaining amount is equal to or less than a threshold value, execution of the second recording mode is inhibited. Note that in the above-described embodiment, in the standard image quality mode and the high image quality mode, the rate of recorded data (memory use amount) is changed by changing the moving image data compression ratio with the signal processing unit 103, however, the present invention is not limited to this arrangement. For example, it may be arranged such that the frame rate of a moving image captured with the image capturing unit 101 can be changed between 30 frames/second (first recording mode) and 60 frames/second (second recording mode) by operating the operation unit 107 by the user, then, when the alternative block remaining amount is not sufficient, recording at 60 frames/second is inhibited.

Note that in the present embodiment, the recording medium 200 is attachable/dischargeable to/from the video camera 100. Further, it may be arranged such that recording media including a flash memory are included in the video camera main body. In this case, the present invention is similarly applicable.

Second Embodiment

Next, a second embodiment of the present invention will be described. In the first embodiment, the first recording mode and the second recording mode are provided for moving image recording. In the second embodiment, the first recording mode is provided for still image capturing, and the second recording mode, for moving image capturing. The video camera 100 in the second embodiment has the still image processing unit 120 to provide a still image recording/reproduction function, in addition to the moving image recording/reproduction function as shown in FIG. 1. Further, the operation unit 107 has a mode selection switch to select a moving image recording mode and a still image recording mode. The still image processing unit 120 performs known compression coding processing such as JPEG (Joint Photographic Experts Group) processing on still image data stored in the memory 108 in accordance with a still image recording instruction.

In the present embodiment, when the alternative block remaining amount in the recording medium 200 is not sufficient, moving image recording with respect to the recording medium 200 is inhibited, while still image recording is allowed. That is, when the alternative block remaining amount is not sufficient, moving image recording itself is inhibited regardless of high image quality mode or standard image quality mode.

Figure 6:
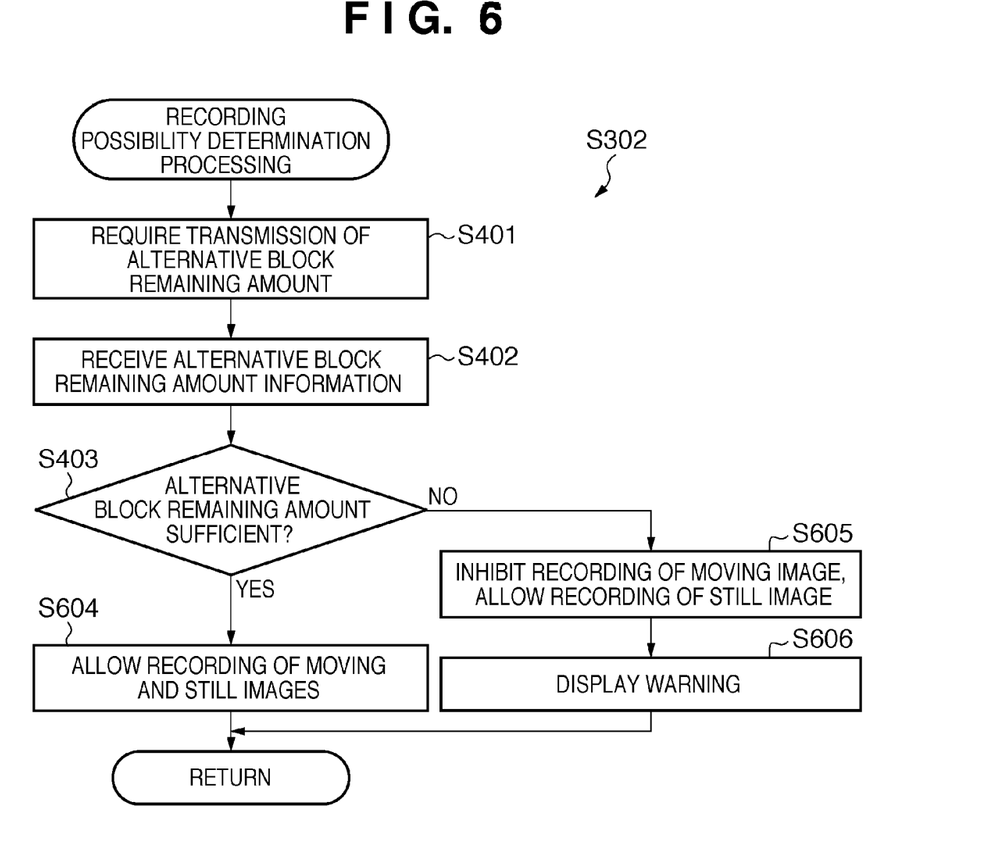
FIG. 6 is a flowchart showing the recording possibility determination processing according to a second embodiment of the present invention.

FIG. 6 is a flowchart showing the recording possibility determination processing at step S302 according to the present embodiment. The processing in FIG. 6 is executed by controlling the respective units by the control unit 106. In FIG. 6, the respective processings at steps S401 to S403 are as described in FIG. 4. At step S403, when it is determined that the remaining amount of the alternative block region 203b is sufficient, the control unit 106 allows moving image recording and still image recording (S604). Further, when it is determined at step S403 that the alternative block remaining amount is not sufficient, the control unit 106 inhibits moving image recording while allows still image recording (S605). Then the control unit 106 displays warning information indicating that status (the moving image recording has been inhibited due to shortage of alternative block) on the display unit 104 (S606).

Figure 7:
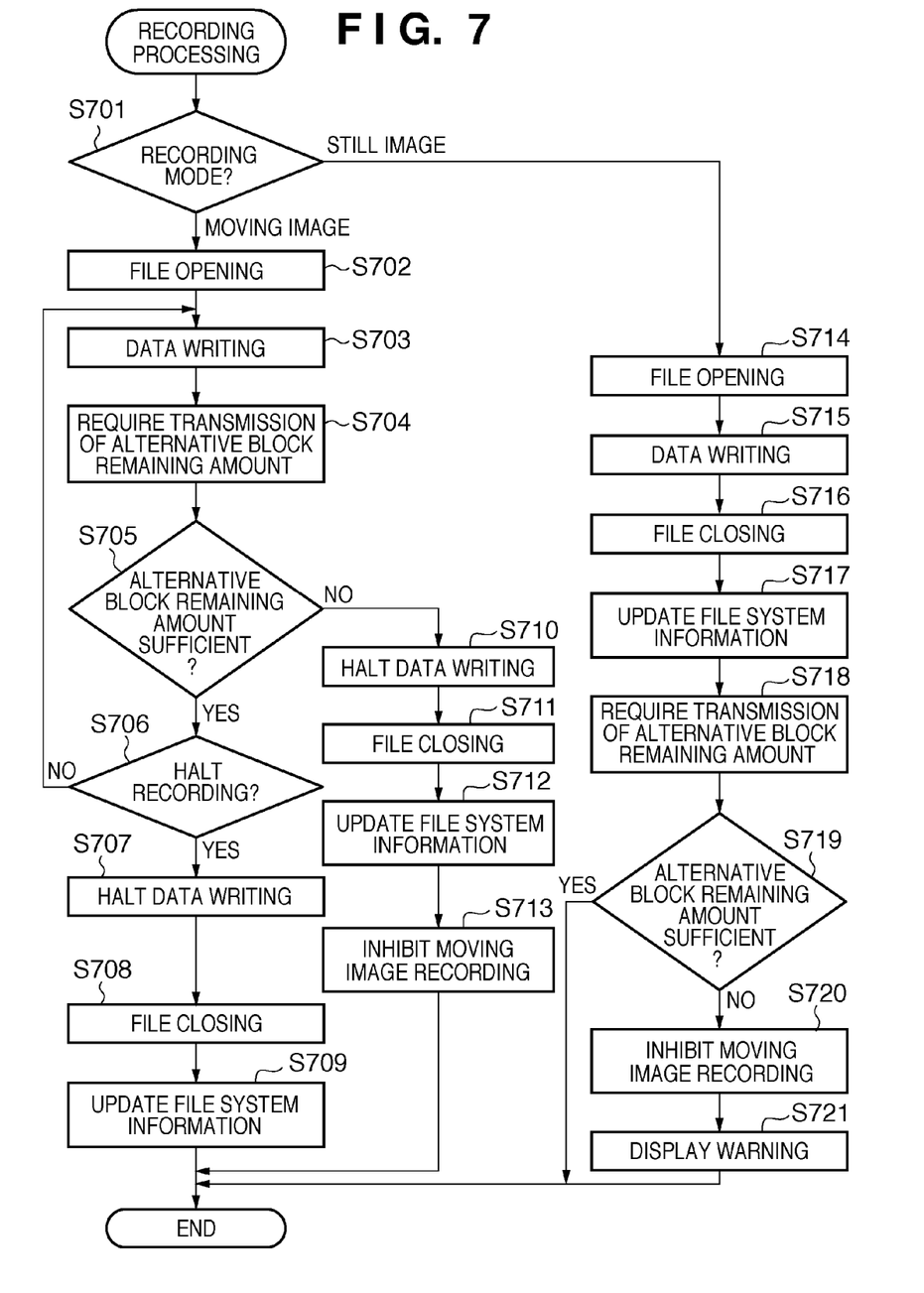
FIG. 7 is a flowchart showing the recording processing according to the second embodiment.

Next, the recording processing according to the second embodiment will be described. FIG. 7 is a flowchart showing the recording processing in the video camera 100 according to the present embodiment. The preprocessing in FIG. 7 is executed by controlling the respective units by the control unit 106. Note that upon start of this recording control, the user can select a desired recording mode from plural recording modes using a predetermined user interface. In the present embodiment, it is possible to select one of the moving image mode to record a moving image and a still image mode to record a still image.

Figure 8:
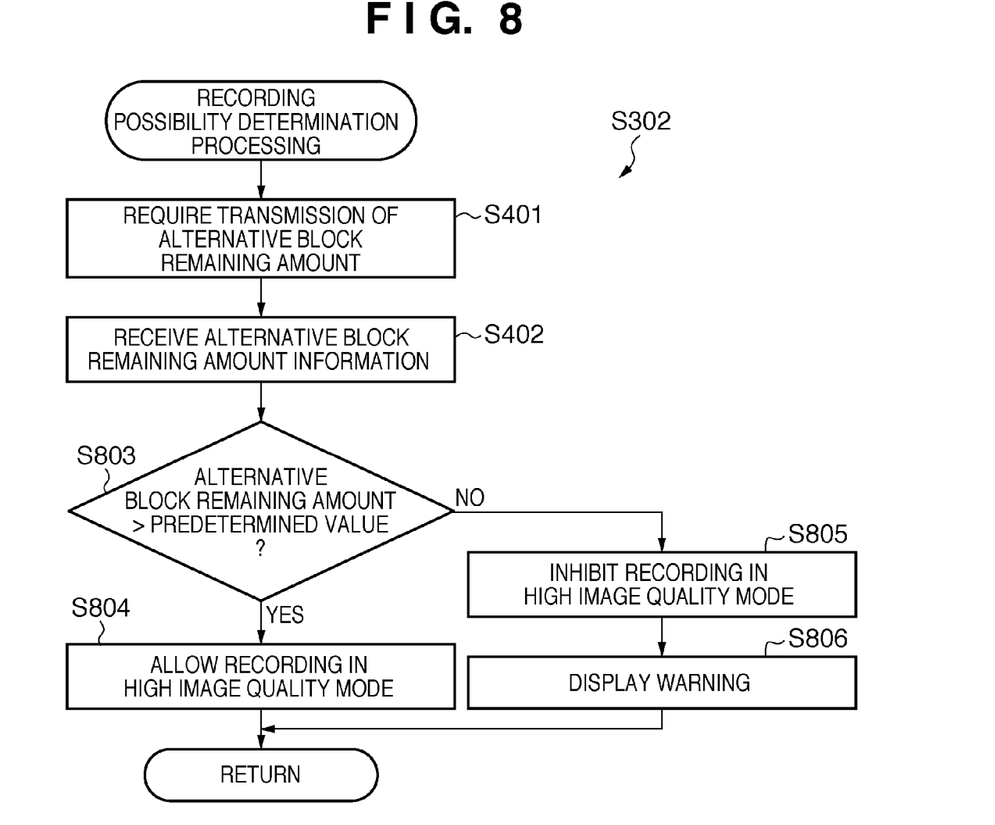
FIG. 8 is a flowchart showing the recording possibility determination processing according to a third embodiment of the present invention.

When the user operates the operation unit 107 to select one of the moving image mode and the still image mode, and instructs to start recording the moving image or to record the still image, the processing in FIG. 8 is started. First, the recording mode selected by the user is determined (S701). When it is determined that the user has selected the moving image mode, the control unit 106 executes the file open processing to open a moving image file for storage of captured moving image data and inputted audio data (S702). In this processing, a file name is determined and this file information is registered in the file system information stored in the memory 108.

Further, the control unit 106 controls the signal processing unit 103 to perform compression processing on the moving image data from the image capturing unit 101 and the audio data from the audio input unit 102, and stores the compressed moving image data and audio data into the memory 108. At this time, as described in the first embodiment, the signal processing unit 103 compresses the moving image data at a compression ratio corresponding to the high image quality mode or the standard image quality mode. Then, when a predetermined amount of moving image data and audio data corresponding to the writing unit has been stored in the memory 108, the record/reproduction unit 109 reads the predetermined amount of data from the memory 108, and writes the data onto the recording medium 200 (S703).

When the data writing for one recording unit has been completed, the control unit 106 requires transmission of the alternative block remaining amount information from the recording medium 200 (S704). The controller 202 of the recording medium 200 detects the remaining amount of the alternative block region 203b and transmits information indicating the remaining amount. The control unit 106 receives the alternative block remaining amount information, and determines whether or not the alternative block remaining amount is sufficient (S705).

When it is determined that the alternative block remaining amount is sufficient, the control unit 106 continues the writing, and waits for a recording halt instruction from the user. When the user operates the operation unit 107 to instruct to halt the recording (S706), the control unit 106 halts the storage of new moving image data and audio data with respect to the memory 108 at that time. Then, the control unit 106 writes the stored data onto the recording medium 200, and halts the writing (S707). Next, the control unit 106 closes the currently recorded file (S708), changes the content of the file system information stored in the memory 108, and writes the file system information onto the recording medium 200, thereby the update is completed (S709).

On the other hand, at step S705, when it is determined that the alternative block remaining amount is not sufficient, the control unit 106 halts the data writing before reception of the recording halt instruction from the user (S710), and closes the currently-recorded file (S711). Then the control unit 106 changes the content of the file system information stored in the memory 108 in accordance with the recording halt, and writes the file system information onto the recording medium 200, thereby the update is completed (S712). Further, the control unit 106 inhibits moving image recording in the high image quality mode hereafter (S713).

Further, when it is determined at step S701 that the still image mode has been selected, the control unit 106 executes file open processing to open a still image file for storage of still image data (S714). The control unit controls the image capture unit 101 to capture the image data of one picture corresponding to the still image recording instruction from the operation unit 107 and to output the captured image data of one frame as a still picture. The control unit 106 controls the still image processing unit 120 to read the still image data for one frame outputted and stored in the memory 108 and to perform compression processing on the still image data for one frame. The still image processing unit performs the compression processing on the still image data for one frame, and stores the compressed still image data into the memory 108. Then the control unit 106 reads the still image data stored in the memory 108 and writes it onto the recording medium 200 (S715). When the writing of one frame still image data has been completed, the control unit 106 closes the still image file (S716). Then the control unit 106 changes the content of the file system information stored in the memory 108 and writes the file system information onto the recording medium 200, thereby completing the update (S717).

Next, the control unit 106 requires transmission of the alternative block remaining amount information from the recording medium 200 (S718). The controller 202 of the recording medium 200 detects the remaining amount of the alternative block region 203b and transmits information indicating the remaining amount. The control unit 106 receives the alternative block remaining amount information, and determines whether or not the alternative block remaining amount is sufficient (S719).

When it is determined that the alternative block remaining amount is sufficient, the control unit 106 terminates the processing. At this time, moving image recording is allowed. On the other hand, when it is determined that the alternative block remaining amount is not sufficient, the control unit 106 inhibits the moving image recording hereinafter (S720). Then the control unit 106 displays warning information indicating that status (the moving image recording has been inhibited due to shortage of alternative block) on the display unit 104 for a predetermined period (S721).

Note that in the present embodiment, when the alternative block remaining amount is not sufficient, moving image recording itself is inhibited. However, as in the case of the first embodiment, it may be arranged such that when the alternative block remaining amount is not sufficient, moving image recording in the high image quality mode is inhibited while recording in the standard image quality mode is allowed.

Third Embodiment

Next, a third embodiment of the present invention will be described. In the first and second embodiments, it is determined whether or not the alternative block remaining amount is sufficient (existing), and in accordance with the result of determination, it is determined whether or not moving image recording in the high image quality mode or the moving image recording itself is allowed. On the other hand, in the third embodiment, it is determined whether or not the alternative block remaining amount is greater than a predetermined value which is not zero, and recording mode allowance/inhibition is controlled in accordance with the result of determination. Note that in the present embodiment, the video camera 100 has the same configuration as that in FIG. 1.

FIG. 8 is a flowchart showing the recording possibility determination processing at step S302 according to the third embodiment. The processing in FIG. 8 is executed by controlling the respective units by the control unit 106. In FIG. 8, steps S401 and S402 are as described in FIG. 4. The control unit 106 receives the information indicating the alternative block remaining amount, then compares the received remaining amount of the alternative block region 203b with a predetermined value, and determines whether or not the alternative block remaining amount is greater than the predetermined value as a threshold value (S803). When it is determined that the remaining amount of the alternative block 203b is greater than the predetermined value, the control unit 106 allows moving image recording in the high image quality mode and the standard image quality mode (S804). Further, when it is determined that the alternative block remaining amount is equal to or less than the predetermined value, the control unit 106 inhibits moving image recording in the high image quality mode while allows moving image recording in the standard image quality mode (S805). Then the control unit 106 displays warning information indicating that status (the moving image recording has been inhibited due to shortage of alternative block) on the display unit 104 (S806).

Next, the predetermined value used as a threshold value at step S803 will be described. In the present embodiment, a data amount for one writing unit is set as the predetermined value. That is, as the data amount for the one writing unit (the number of blocks corresponding to this data amount) is set as the predetermined value, even upon occurrence of defect block, at least data for one writing unit can be written into the alternative block. Therefore, as long as the alternative block for one writing unit remains, retry processing does not occur regarding at least data for one writing unit to be recorded. Further, according to the present embodiment, when the alternative block remaining amount is less than the data amount for one writing unit, retry processing may occur during data writing. In this case, moving image recording in the high image quality mode is inhibited.

Note that in the above-described respective embodiments, regarding one of two recording modes (first and second recording modes) with a larger memory use amount (second recording mode), selection and execution of the mode is inhibited in correspondence with the alternative block remaining amount. However, the present invention is not limited to these embodiments, but it is apparent that the above-described processing is applicable to a case where three or more recording modes are classified as a recording mode for which selection and recording are inhibited or a recording mode for which selection and recording are allowed in accordance with the alternative block remaining amount. For example, it is possible to provide a data recording apparatus in which recording modes, "high image quality moving image", "standard image quality moving image", "standard image quality moving image (no audio data)", "still image capturing", and "audio recording" are selectable. In this case, the "high image quality moving image" and the "standard image quality moving image" modes are set as recording modes in which the memory use amount is large and for which selection and recording are inhibited in correspondence with the alternative block remaining amount.

According to the present invention, during data recording onto a recording medium having an alternative block, occurrence of abnormality such as buffer memory overflow can be prevented.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-007443, filed Jan. 15, 2010, which is hereby incorporated by reference herein in its entirety.

What is claimed is:

1. A recording apparatus comprising:
a recording unit configured to record data including first data and second data different from the first data onto a recording medium having a plurality of blocks including an alternative block for a defect block;
an acquisition unit configured to acquire an alternative block remaining amount of the recording medium; and
a control unit configured to select, in accordance with the alternative block remaining amount acquired by the acquisition unit, data inhibited from being recorded in the recording medium among the first data and the second data and to control the recording unit such that the selected data is inhibited from being recorded in the recording medium,
wherein if the alternative block remaining amount acquired by the acquisition unit is equal to or less than a threshold value, the control unit selects the second data as the data inhibited from being recorded in the recording medium among the first data and the second data and controls the recording unit such that the first data is recorded in the recording medium and the second data is inhibited from being recorded in the recording medium.

2. The apparatus according to claim 1, wherein if the alternative block remaining amount acquired by said acquisition unit is equal to or less than the threshold value during recording of the second data, the control unit halts the recording.

3. The apparatus according to claim 1, wherein both the first data and the second data are moving image data, and the second data has a data rate higher than the first data.

4. The apparatus according to claim 1, wherein both the first data and the second data are moving image data, and the second data has a frame rate higher than the first data.

5. The apparatus according to claim 1, wherein the first data is still image data, and the second data is moving image data.

6. The apparatus according to claim 1, wherein said recording unit stores into a buffer memory data to be recorded, then, responsive to a predetermined amount of data being stored in the buffer memory, records the predetermined amount of data onto the recording medium,
and wherein the threshold value is a number of blocks required for recording the predetermined amount of data onto said recording medium.

7. A recording apparatus control method, comprising:
a data recording step of recording data including first data and second data different from the first data onto a recording medium having a plurality of blocks including an alternative block for a defect block;
an acquisition step of acquiring an alternative block remaining amount of recording medium; and
a control step of selecting, in accordance with the alternative block remaining amount acquired at the acquisition step, data inhibited from being recorded in the recording medium among the first data and the second data and controlling the recording unit such that the selected data is inhibited from being recorded in the recording medium,
wherein if the alternative block remaining amount acquired at the acquisition step is equal to or less than a threshold value, the control step selects the second data as the data inhibited from being recorded in the recording medium among the first data and the second data and controls the recording unit such that the first data is recorded in the recording medium and the second data is inhibited from being recorded in the recording medium.

8. A non-transitory computer-readable medium holding a program to cause a computer to execute the data recording apparatus control method in claim 7.

9. A data recording apparatus comprising:
a recording unit configured to record a plurality of types of information data on a recording medium having a plurality of blocks including an alternative block for a defect block;
an acquisition unit configured to acquire an alternative block remaining amount of the recording medium; and
a control unit configured to designate, in accordance with an alternative block remaining amount in the recording medium acquired by the acquisition unit, a type of data inhibited from being recorded among the plurality of types and to control the recording unit such that data of the designated type is inhibited from being recorded in the recording medium,
wherein if the alternative block remaining amount is equal to or less than the threshold value, the control unit designates a predetermined type as the type of the data inhibited from being recorded and controls the recording unit such that data of a type different from the predetermined type is recorded in the recording medium and data of the designated type is inhibited from being recorded in the recording medium.

* * * * *